No. 799,551. PATENTED SEPT. 12, 1905.
H. S. EYRE.
ANTISKIDDING DEVICE FOR VEHICLES AND CYCLES.
APPLICATION FILED FEB. 23, 1904.

Witnesses
George E. Hunt
T. B. Williams

Inventor
Henry Samuel Eyre
per W. E. Evans
Attorney

UNITED STATES PATENT OFFICE.

HENRY S. EYRE, OF ST. LEONARDS-ON-SEA, ENGLAND.

ANTISKIDDING DEVICE FOR VEHICLES AND CYCLES.

No. 799,551.        Specification of Letters Patent.        Patented Sept. 12, 1905.

Application filed February 23, 1904. Serial No. 194,940.

*To all whom it may concern:*

Be it known that I, HENRY SAMUEL EYRE, a subject of the King of Great Britain and Ireland, residing at 3 Grosvenor Gardens, St. Leonards-on-Sea, in the county of Sussex, England, have invented new and useful Improvements Relating to Antiskidding Devices Applicable to Vehicles and Cycles, of which the following is a specification.

This invention relates to antiskidding devices applicable to vehicles and cycles, and has for its object to provide simple, effective, and inexpensive means of ready application to the wheels of a vehicle or cycle to prevent skidding or slipping thereof.

The invention consists in the provision of flexible members upon the wheels of the vehicle or cycle, which on the rotation thereof continuously come into contact with the ground immediately beside the tread of the tire, so that on any lateral movement of the wheels these members will pass under the tire, and thus prevent further lateral movement. The flexible members conveniently take the form of a number of bows of stranded wire, linked chain, rope, or the like, so mounted upon the wheel as to come in contact with the ground on the rotation thereof, the members being in such position as not to leave any substantial interval between them.

According to the invention means are provided for bringing the flexible members out of their operative position when not required for use.

The invention is illustrated, by way of example, in the accompanying drawings, in which—

Figure 1:
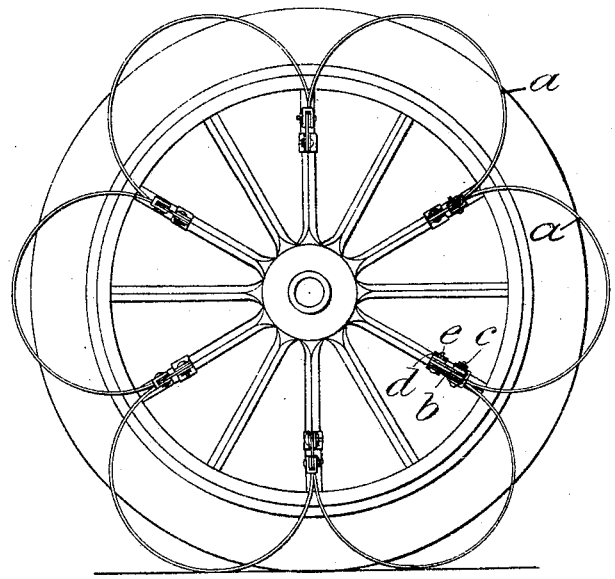
Figure 2:
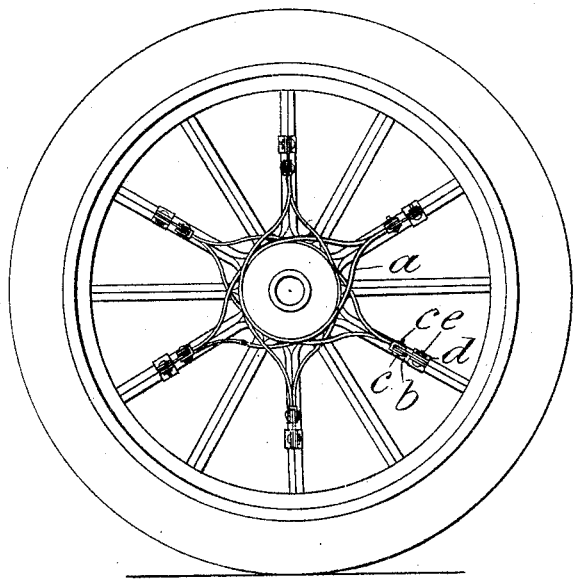

Figure 1 represents the front elevation of a wheel applied with flexible antiskidding members according to the invention. Fig. 2 is a corresponding front elevation showing the said members in their inoperative position, while Fig. 3 is an end sectional elevation corresponding to Fig. 1.

In carrying the invention into effect, as illustrated in the accompanying drawings, I provide a number of flexible members $a$, advantageously of bow shape and so formed and disposed upon the wheel as to be brought into contact with the ground on the rotation thereof and in such manner as to extend onto the tread of the tire on the lateral movement of the wheel.

The members $a$ have their extremities secured to hinging-links $b$ by means of bolts $c$, the links $b$ being secured to clamping-brackets $d$ and being connected to the clamping-brackets by means of pins $e$, so that thus when the flexible antiskidding members $a$ are not required for use they may be brought into the position indicated in Fig. 2 by the links $b$ being turned upon the bolts $e$, as illustrated.

Figure 3:
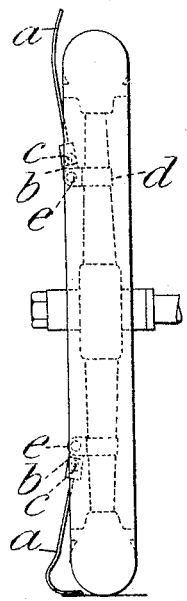

In operation it will be understood that on the flexible antiskidding members $x$ being turned into the position indicated in Figs. 1 and 3 they will successively come to the ground on their reaching the lowest position, so that on the lateral movement of the wheel on greasy roads the members $a$ will be held in their position and on the lateral movement of the wheel will come to lie beneath the tread, so as thus to create sufficient friction to prevent further lateral movement of the wheel.

It will be understood that the illustrated example is intended for use on the wheels of motor-cars and that the flexible antiskidding members $a$ are mounted on the outer side of the wheels.

It will be understood that any other form may be given to the members. For example, loose members may be provided with free extremities, linked chains, rope, or the like, while similarly the method of fastening the members onto the wheel may be modified without departing from the present invention, and instead of providing for the movement of the members into the position indicated in Fig. 2 the members may be provided each to be independently retained in their disengaged position in any suitable manner.

What I claim as my invention, and desire to secure by Letters Patent, is—

1. An antiskidding device for application to the wheels of vehicles and cycles consisting of flexible members mounted upon the wheel laterally of the tire and in proximity thereto and protruding beyond the tire of the wheel to such an extent as to be capable of passing completely under the tread or outer peripheral surface of the tire substantially as described.

2. An antiskidding device for application to the wheels of vehicles and cycles consisting of flexible members mounted on the wheel laterally of the tire and in proximity thereto and protruding beyond the tire of the wheel to such an extent as to be capable of passing completely under the tread or outer peripheral surface of the tire, said flexible members being formed as cords, substantially as described.

3. An antiskidding device for application to the wheels of vehicles and cycles consisting of flexible members mounted on the wheel laterally of the tire and in proximity thereto and protruding beyond the tire of the wheel to such an extent as to be capable of passing completely under the tread or outer peripheral surface of the tire, said flexible members being formed of cords of substantial bow shape and being mounted so as to be brought out of their position adjacent to the tire of the wheel, substantially as described.

4. An antiskidding device for application to the wheels of vehicles and cycles consisting of bow-shaped flexible members, links to which the extremities of said members are connected, clipping-brackets on which said links are carried, said clipping-brackets being mounted upon the spokes of the wheel, substantially as described.

5. An antiskidding device for application to the wheels of vehicles and cycles, consisting of bow-shaped flexible members, the opposite extremities of adjacent members being connected to a common link, a clipping-bracket to which said link is pivotally connected, said clipping-brackets being mounted upon the spokes, substantially as described.

6. An antiskidding device for application to the wheels of vehicles and cycles consisting of bow-shaped flexible members, links to which the extremities of said members are connected, clipping-brackets on which said links are carried, said clipping-brackets being mounted upon the spokes of the wheel, and a central boss on the outside face of the wheel around which the said flexible members are disposed when placed in their inoperative position.

In testimony whereof I have signed my name to this specification in the presence of two subscribing witnesses.

H. S. EYRE.

Witnesses:
    ALBERT C. SMITH,
    WALTER J. SKERTEN.